United States Patent [19]

Onishi

[11] Patent Number: 5,329,450
[45] Date of Patent: Jul. 12, 1994

[54] CONTROL METHOD FOR MOBILE ROBOT SYSTEM

[75] Inventor: Masanori Onishi, Ise, Japan

[73] Assignee: Shinko Electric Co., Ltd., Japan

[21] Appl. No.: 879,883

[22] Filed: May 7, 1992

[30] Foreign Application Priority Data

May 10, 1991 [JP] Japan ................................. 3-106109

[51] Int. Cl.⁵ .......................... G06F 7/70; G06G 7/64
[52] U.S. Cl. ............................... 364/424.02; 364/468; 318/568.15
[58] Field of Search ................... 364/424.02, 513, 468, 364/488, 478; 414/789; 180/167, 168, 169

[56] References Cited

U.S. PATENT DOCUMENTS

| | | | |
|---|---|---|---|
| 4,473,883 | 9/1984 | Yoshida et al. | 364/474 |
| 4,577,284 | 3/1986 | Christy et al. | 364/513 |
| 4,706,204 | 11/1987 | Hattori | 364/513 |
| 4,712,183 | 12/1987 | Shiroshita et al. | 364/513 |
| 4,890,241 | 12/1989 | Hoffman et al. | 364/513 |
| 4,956,777 | 9/1990 | Cearley et al. | 364/424.02 |
| 4,988,934 | 1/1991 | Toyoda et al. | 318/568.15 |
| 5,032,975 | 7/1991 | Yamamoto et al. | 364/134 |

FOREIGN PATENT DOCUMENTS

| | | |
|---|---|---|
| 0221643 | 8/1986 | European Pat. Off. . |
| 0437634 | 10/1990 | European Pat. Off. . |
| 62-32516 | 2/1987 | Japan . |
| 62-32517 | 2/1987 | Japan . |
| 62-32518 | 2/1987 | Japan . |
| 62-32519 | 2/1987 | Japan . |

OTHER PUBLICATIONS

Patent Abstracts of Japan, Jan. 9, 1991 Appl No 64-138219.
Patent Abstracts of Japan, Apr. 18, 1987 Appl No 60-224722.
Patent Abstracts of Japan, Feb. 12, 1987 Appl. No. 60-172,705.
Heinz Bernhardt, et al., Siemens Energy & Automation, Modular Control System Keeps AGVs Moving, vol. 12, No. 3, May/Jun. 1990, pp. 26–30.
Ramchandran Jaikumar and Marius M. Solomon, Journal of Manufacturing Systems, Dynamic Scheduling of Automated Guided Vehicles for a Certain Class of Systems, vol. 9, No. 4, Apr. 1990, pp. 315–323.

*Primary Examiner*—Thomas G. Black
*Assistant Examiner*—J. Harold Louis-Jacques
*Attorney, Agent, or Firm*—Scully, Scott, Murphy & Presser

[57] ABSTRACT

When mobile robots having no task exist in the system and tasks not completed are remaining, a control station instructs the mobile robots to evaluate the remaining tasks. The mobile robots having no task then evaluate the remaining tasks and report corresponding evaluation values to the control station. The control station sequentially selects the combination of one of the mobile robots, having no task and one of the remaining tasks which are not assigned to the mobile robots so that the combination presenting the best evaluation value is selected, and assigns the task of the selected combination to the mobile robot of the selected combination.

2 Claims, 1 Drawing Sheet

FIG.1
|    | W1  | W2  | W3  |
|----|-----|-----|-----|
| R1 | 1.5 | 0.5 | 3.2 |
| R2 | 4.4 | 2.5 | 1.3 |
| R3 | 0.7 | 3.6 | 9.2 |
FIG.2
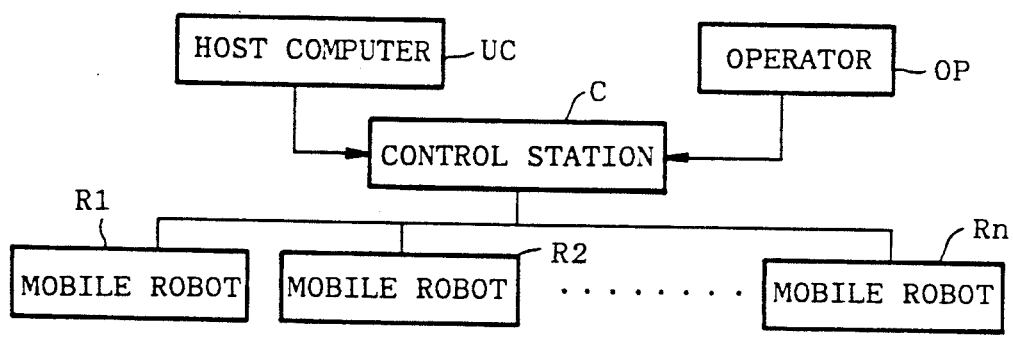
FIG.3
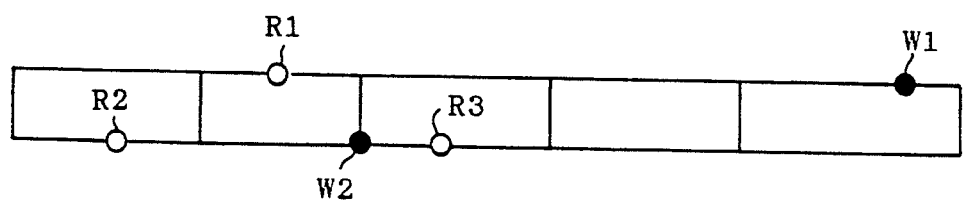

CONTROL METHOD FOR MOBILE ROBOT SYSTEM

BACKGROUND OF THE INVENTION

The present invention relates to a method and a device for controlling mobile robot systems employing a control station and a plurality of mobile robots.

Recent developments of factory automation techniques offer mobile robot systems which employ a control station and a plurality of mobile robots, each of which travels and performs a task according to an instruction given by the control station. FIG. 2 is a block diagram showing the functional configuration of this kind of mobile robot system. In FIG. 2, C designates the control station; and R1 through Rn designate the mobile robots. Control station C and each one of mobile robots R1 through Rn communicate by means of wire communication or radio communication. The instructions are given to control station C by a host computer UC or an operator OP. These instructions may be sequentially supplied to control station C at short intervals which are shorter than the operation time required for the mobile robots to perform the tasks. Therefore, the instructions are stacked in control station C. When a mobile robot Rk having no task occurs, the oldest instruction among the stacked instructions is selected and transmitted to the mobile robot Rk. The robot then starts to carry out the task designated by the instruction. When a plularity of mobile robots, each having no task, occur simultaneously in the system, control station C instructs the mobile robots to determine the best travel route and to evaluate the route. Each robot then searches the possible travel routes through which the mobile robot can travel to the work point at which the task is to be carried out, and selects the best travel route which is the most preferable, for example, the possible travel route having the shortest length, or the possible travel route generating the lowest loss of the power of the robot. Each robot further calculate the losses which are generated when the robot travels through the best travel route and determines the evaluation value based on the calculated results. The evaluation result obtained by each robot is transmitted to control station C. Control station C selects one of the robots, which transmits the most preferable evaluation value.

In the above system, however, the operation efficiency of the system may often be low due to the above-described instruction selection in which the instructions are selected according to the sequence of the instructions and the older instruction is selected earlier. For example, suppose the following case occurs:

(1) Mobile robots R1 through R3, having no task, are waiting for instructions in the system as shown in FIG. 3.
(2) The instructions corresponding to tasks W1 and W2, which are to be performed at the points respectively indicated by "W1" and "W2" in FIG. 3, are stacked.
(3) The instruction of task W1 is older than the instruction of task W2.

In this case, control station C instructs mobile robots R1 through R3 to determine the best travel route and to evaluate the route for executing the task W1 because the instruction of task W1 is older than the instruction of task W2. When the evaluation values are transmitted from mobile robots R1 through R3 to control station C, the control station then instructs the task W1 to one of the robots which presents the best evaluation value. In this manner, task W1 is carried out earlier than task W2. However, task W2 should be carried out before task W1 in the case shown in FIG. 3, because the all mobile robots R1 through R3 are closer to the work point of task W2 rather than the work point of task W1.

SUMMARY OF THE INVENTION

In consideration of the above, it is an object of the present invention to provide a control method for a mobile robot system which improves the operation efficiency of the system.

In an aspect of the present Invention, the present invention provides a control method which is preferable for a mobile robot system having a control station and a plurality of mobile robots which travel to work points instructed by the control station and carry out tasks instructed by the control station. In the control method, the following steps are executed:

(a) When mobile robots having no task exist in the system and tasks not completed are remaining, the control station instructs the mobile robots to evaluate the remaining tasks.
(b) The mobile robots evaluate the remaining tasks and report the evaluation values to the control station.
(c) The control station sequentially selects the one of the combinations of the mobile robots having no task and the remaining tasks based on the evaluation values of the combinations in such a manner that the combination representing the better evaluation value is selected earlier, and assigns the task of the selected combination to the mobile robot of the selected combination.

Further objects and advantages of the present invention will be understood from the following description of the preferred embodiments with reference to the drawing.

BRIEF DESCRIPTION OF THE DRAWING

FIG. 1 is a block diagram showing the evaluation table which is used for the control method of a preferred embodiment of the present invention.

FIG. 2 is a block diagram showing the configuration of the conventional mobile robot system.

FIG. 3 is a chart for describing the problem of the conventional control method for the mobile robot system.

DETAILED DESCRIPTION OF THE PREFERRED EMBODIMENTS

Hereinafter, description will be given with respect to a control method for a mobile robot system according to the preferred embodiment of the present invention. Suppose the following case occurs:

(1) Mobile robots R1 through R3, having no task, are waiting for instructions in the system as shown in FIG. 3.
(2) The instructions corresponding to tasks W1 through W3, which are to be performed at the points respectively indicated by "W1" through "W3" in FIG. 2, are stacked.
(3) The instructions of task W1 through W3 were generated in the order W1, W2 and W3.

In the method of the preferred embodiment, control station C gives the following instructions to mobile robots R1 through R3:

a) Determine the best travel routes for traveling to the work points at which tasks W1 through W3 are to be performed, from the point at which the corresponding robot rests.

b) Evaluate the best travel routes corresponding to task W1 through W3.

Mobile robot R1 through R3 determine the best travel routes based on a predetermined algorithm and evaluate the best travel routes based on a predetermined evaluation function in response to the instructions from control station C. Conventional algorithm and evaluation function are used for the determination of the best travel route and the evaluation. Such conventional techniques are disclosed in Japanese patent laid-open publication No. 62-32516 or Japanese patent laid-open publication No. 62-32517.

Mobile robots R1 through R3 report the evaluation values corresponding to task W1 through W3 to control station C. In the case where the evaluation value for the best travel route between the position of mobile robot R1 and the work points of tasks W1, W2, and W3 are 1.5, 0.5, and 3.2, respectively, these values 1.5, 0.5, and 3.2 are sent to control station C from mobile robot R1. Similarly, the evaluation values calculated by the other mobile robots are sent to control station C. Control station C then makes an evaluation table which includes the evaluation values corresponding to the combinations of mobile robots R1 through R3 and tasks W1 through W3. FIG. 1 shows the example of the evaluation table. In this example, the combination of mobile robot R1 and task W2 presents the best evaluation value 0.5 of all evaluation values in the table. Accordingly, control station C decides that task W2 should be assigned to mobile robot R1. Next, control station C deletes the evaluation values corresponding to mobile robot R1 and task W2, i.e., evaluation values for the combination of R1 and W1, and for the combination of R1 and W2, and for the combination of R1 and W3, and for the combination of R2 and W2, and for the combination of R3 and W2. After the deletion, control station C selects one of the combinations which presents the best evaluation value in the remaining combinations. In this case, the combination of R3 and W1 presents the best evaluation value 0.7. Accordingly, the control station decides that task W1 is to be assigned to mobile robot R3. Next, control station decides that the remaining task W3 is to be assigned to the remaining mobile robot R2. In this manner, the tasks are assigned to the mobile robots. Control station C then instructs tasks W2, W1, and W3, respectively, to mobile robots R1, R3, and R2 simultaneously. The mobile robots then begin to travel to carry out the instructed tasks.

By using the method, the tasks given to the mobile robot system can be achieved at high efficiency for the following reasons:

(1) The tasks are assigned to the mobile robots in consideration of all the mobile robots which have no task and all the remaining tasks. Accordingly, a high operation efficiency is obtained from the mobile robot system.

(2) The mobile robots carry out the search operation for determining the best travel routes and the evaluation for the routes simultaneously. Accordingly, all the evaluation values, which are used for assigning the tasks to the robots, are obtained In a short time.

(3) The control station assigns the tasks to the mobile robots based on only the evaluation values received from the mobile robot. Accordingly, the assigning is completed in a short time.

What is claimed is:

1. A method of controlling a mobile robot system of the type having a control station and a plurality of mobile robots, wherein the control station transmits instructions to the robots to travel to and to perform tasks at a plurality of work points, the method comprising the steps of:

(a) storing at the control station tasks for the robot;

(b) assigning some of the tasks to the robots;

(c) identifying any of the robots not currently having any assigned tasks;

(d) identifying tasks not currently assigned to any of the robots;

(e) instructing the identified robots to evaluate the identified tasks, including the steps of each of the identified robots, 1) determining a best travel route to travel to each respective work point at which each unassigned task is to be performed, and 2) generating, for each unassigned task, an evaluation value depending on the best travel route to the work point at which the unassigned task is to be performed, and 3) transmitting the generated evaluation values to the control station;

(f) creating at the control station, an evaluation table containing the evaluation values transmitted to the control station;

(g) selecting an optimum evaluation value from the evaluation values in the evaluation table;

(h) determining the robot from which said optimum evaluation value was transmitted to the control station;

(i) determining the unassigned task for which said optimum evaluation value was generated;

(j) assigning the determined unassigned task to the determined robot;

(k) deleting from the evaluation table all of the evaluation values transmitted to the control station from the determined robot and all of the evaluation values generated for the determined unassigned task; and (l) repeating steps (g) through (k) until all of the unassigned tasks have been assigned to the robots.

2. A method according to claim 1, further including the step of, the control station transmitting instructions substantially simultaneously to all of the identified robots to perform the identified tasks.

* * * * *